(12) United States Patent
Mimura et al.

(10) Patent No.: US 11,192,485 B2
(45) Date of Patent: Dec. 7, 2021

(54) VEHICLE CONTROL SYSTEM, VEHICLE CONTROL METHOD, AND STORAGE MEDIUM

(71) Applicant: HONDA MOTOR CO., LTD., Tokyo (JP)

(72) Inventors: Yoshitaka Mimura, Wako (JP); Masahiko Asakura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 248 days.

(21) Appl. No.: 16/349,997

(22) PCT Filed: Dec. 21, 2016

(86) PCT No.: PCT/JP2016/088057
§ 371 (c)(1),
(2) Date: May 15, 2019

(87) PCT Pub. No.: WO2018/116396
PCT Pub. Date: Jun. 28, 2018

(65) Prior Publication Data
US 2019/0308539 A1 Oct. 10, 2019

(51) Int. Cl.
*B60N 3/10* (2006.01)
*B60W 60/00* (2020.01)
*B60W 10/04* (2006.01)
(Continued)

(52) U.S. Cl.
CPC .............. *B60N 3/102* (2013.01); *B60N 3/00* (2013.01); *B60W 10/04* (2013.01); *B60W 10/20* (2013.01);
(Continued)

(58) Field of Classification Search
CPC .......... B60N 3/102; B60N 3/00; B60N 3/002; B60W 10/04; B60W 10/20; B60W 30/18;
(Continued)

(56) References Cited

U.S. PATENT DOCUMENTS 8,433,470 B1 4/2013 Szybalski et al.
2014/0219508 A1* 8/2014 Gunter ................ B60R 25/2054
382/104

(Continued)

FOREIGN PATENT DOCUMENTS

CN 101134447 3/2008
CN 101151173 3/2008

(Continued)

OTHER PUBLICATIONS

Chinese Office Action for Chinese Patent Application No. 201680090798.0 dated Feb. 24, 2021.
International Search Report and Written Opinion for International Application No. PCT/JP2016/088057 dated Mar. 14, 2017, 9 pgs.

*Primary Examiner* — Genna M Mott
(74) *Attorney, Agent, or Firm* — Amin, Turocy & Watson, LLP

(57) ABSTRACT

A vehicle control system includes an object placement portion in which an object can be placed, an automated driving controller configured to execute automated driving for automatically controlling at least one of acceleration or deceleration and steering of a vehicle, and an object placement controller configured to change the object placement portion from a first mode to a second mode in which the object placement portion is more easily used by an occupant of the vehicle than in the first mode in accordance with a control state of automated driving executed by the automated driving controller.

14 Claims, 13 Drawing Sheets

(51) Int. Cl.
  *B60W 10/20* (2006.01)
  *B60W 30/18* (2012.01)
  *B60W 50/08* (2020.01)
  *B60N 3/00* (2006.01)
  *B60W 50/00* (2006.01)

(52) U.S. Cl.
  CPC ............ *B60W 30/18* (2013.01); *B60W 50/08* (2013.01); *B60W 2050/0072* (2013.01); *B60W 2400/00* (2013.01); *B60W 2710/20* (2013.01); *B60W 2720/106* (2013.01)

(58) Field of Classification Search
  CPC ......... B60W 50/08; B60W 2050/0072; B60W 2400/00; B60W 2710/20; B60W 2720/106; B60W 2540/223; B60W 60/0053
  See application file for complete search history.

(56) References Cited

U.S. PATENT DOCUMENTS

| | | | |
|---|---|---|---|
| 2015/0094897 | A1 | 4/2015 | Cuddihy et al. |
| 2016/0375811 | A1* | 12/2016 | Bendewald ............ B60N 3/002 701/49 |
| 2017/0368936 | A1* | 12/2017 | Kojima ................. B60W 40/08 |

FOREIGN PATENT DOCUMENTS

| | | |
|---|---|---|
| DE | 19906052 | 4/2011 |
| DE | 102014219223 | 4/2015 |
| DE | 102015207378 | 10/2016 |
| JP | 64-028335 | 2/1989 |
| JP | 2016-168972 | 9/2016 |
| WO | 2015-132119 | 9/2015 |

* cited by examiner

VEHICLE CONTROL SYSTEM, VEHICLE CONTROL METHOD, AND STORAGE MEDIUM

TECHNICAL FIELD

The present invention relates to a vehicle control system, a vehicle control method, and a storage medium.

BACKGROUND ART

There is a car table device which is configured with a frame containing a table board attached to an armrest or storage box next to a car seat, the table board is pulled out from the frame, and an object can be placed on the table board pulled out of the frame (for example, Patent Literature 1). In this table device, if the table board is pulled out from the frame, the table board protrudes from the frame, and an object can be placed on the protruding table board.

CITATION LIST

Patent Literature

[Patent Literature 1]
Japanese Unexamined Utility Model Application, First Publication No. S64-28335

SUMMARY OF INVENTION

Technical Problem

Although research on automated driving has advanced in recent years, there has not been enough progress on controlling an in-vehicle state during automated driving.

The present invention has been made in consideration of the above circumstances, and an object thereof is to provide a vehicle control system, a vehicle control method, and a vehicle control program which can provide an object placement portion that is highly convenient for use by a user.

Solution to Problem

According to an aspect, a vehicle control system includes an object placement portion in which an object can be placed, an automated driving controller configured to execute automated driving for automatically controlling at least one of acceleration or deceleration and steering of a vehicle, and an object placement controller configured to change the object placement portion from a first mode to a second mode in which the object placement portion is more easily used by an occupant of the vehicle than in the first mode in accordance with a control state of automated driving executed by the automated driving controller.

According to another aspect, the second mode is a state in which a location of the object placement portion is closer to the occupant of the vehicle than in the first mode.

According to another aspect, the first mode is a state in which the object placement portion is stored in a storage, and the second mode is a state in which the object placement portion has emerged from the storage.

According to another aspect, the second mode is a state in which a direction of a placement surface of the object placement portion is closer to a horizontal direction than in the first mode.

According to another aspect, the automated driving controller executes the automated driving by varying a degree of automated driving, and the object placement controller sets the object placement portion as the second mode in accordance with the degree of automated driving executed by the automated driving controller.

According to another aspect, the object placement controller sets the object placement portion as the second mode when the degree of automated driving executed by the automated driving controller decreases.

According to another aspect, the object placement controller returns the object placement portion to the first mode when the object placement portion is in the second mode and the degree of automated driving increases.

According to another aspect, a state determiner configured to detect a state of the object placement portion is further included, and, in a case in which the object placement portion is in the second mode and the degree of automated driving increases, the object placement controller maintains the object placement portion in the second mode when the state determiner determines that there is an object in the object placement portion.

According to another aspect, a state determiner configured to detect a state of the object placement portion is further included, and, in a case in which the degree of automated driving increases, the object placement controller causes an information output device to output information indicating that there is an object when the state determiner determines that there is an object in the object placement portion.

According to another aspect, an output device configured to output information is further included, and the automated driving controller causes the output device to output information requesting for a switch to manual driving when execution of the automated driving ends, and the object placement controller sets the object placement portion to be in the second mode when the output device outputs information requesting for a switch to the manual driving.

According to another aspect, a state determiner configured to detect a state of the occupant of the vehicle is further included, and the object placement controller sets the object placement portion as the second mode when the state determiner determines that the occupant of the vehicle holds an object with her or his hands.

According to another aspect, the object placement controller sets the object placement portion as the second mode by causing the object placement portion to emerge between a driver's seat and a passenger's seat.

According to another aspect, the object placement controller sets the object placement portion as the second mode when a degree of the automated driving executed by the automated driving controller increases.

According to another aspect, a vehicle control method includes, by an in-vehicle computer, executing automated driving for automatically controlling at least one of acceleration or deceleration and steering of a vehicle, and setting an object placement portion in which an object can be placed from a first mode to a second mode in which the object placement portion can be more easily used by an occupant of the vehicle than in the first mode in accordance with a control state of the executed automated driving.

According to another aspect, a vehicle control program causes an in-vehicle computer to execute automated driving for automatically controlling at least one of acceleration or deceleration and steering of a vehicle, and to set an object placement portion in which an object can be placed from a first mode to a second mode in which the object placement portion is more easily used by an occupant of the vehicle than in the first mode in accordance with a control state of the executed automated driving.

Advantageous Effects of Invention

According to another aspect, the object placement controller sets an object placement portion as a second mode in which the object placement portion is more easily used by the occupant of the vehicle than in a first embodiment in accordance with a control state of automated driving executed by an automated driving controller, and thereby it is possible to provide an object placement portion that is more highly convenient for use by a user when automated driving is executed.

According to another aspect, when the degree of automated driving increases, the object placement portion is automatically returned to a first mode, and thus convenience for use by a user can be more improved.

According to another aspect, in a case in which a degree of automated driving increases, the object placement portion is maintained in a second mode when there is an object in the object placement portion, and thus, when the occupant of the vehicle, who uses the object placement portion, can keep using the object placement portion.

According to another aspect, the object placement portion is in a second mode when the occupant of the vehicle holds an object with her or his hands, and thus it is possible to place the object held by the occupant of the vehicle in the object placement portion and to grip a steering wheel.

According to another aspect, the object placement portion emerges between the driver's seat and the passenger's seat, and thus the object placement portion may not interfere with the occupant of the vehicle and the occupant of the vehicle may easily use the object placement portion.

DESCRIPTION OF EMBODIMENTS

Hereinafter, embodiments of a vehicle control system, a vehicle control method, and a vehicle control program of the present invention will be described with reference to drawings. Hereinafter, description will be provided using XYZ coordinates if required.

Figure 1:
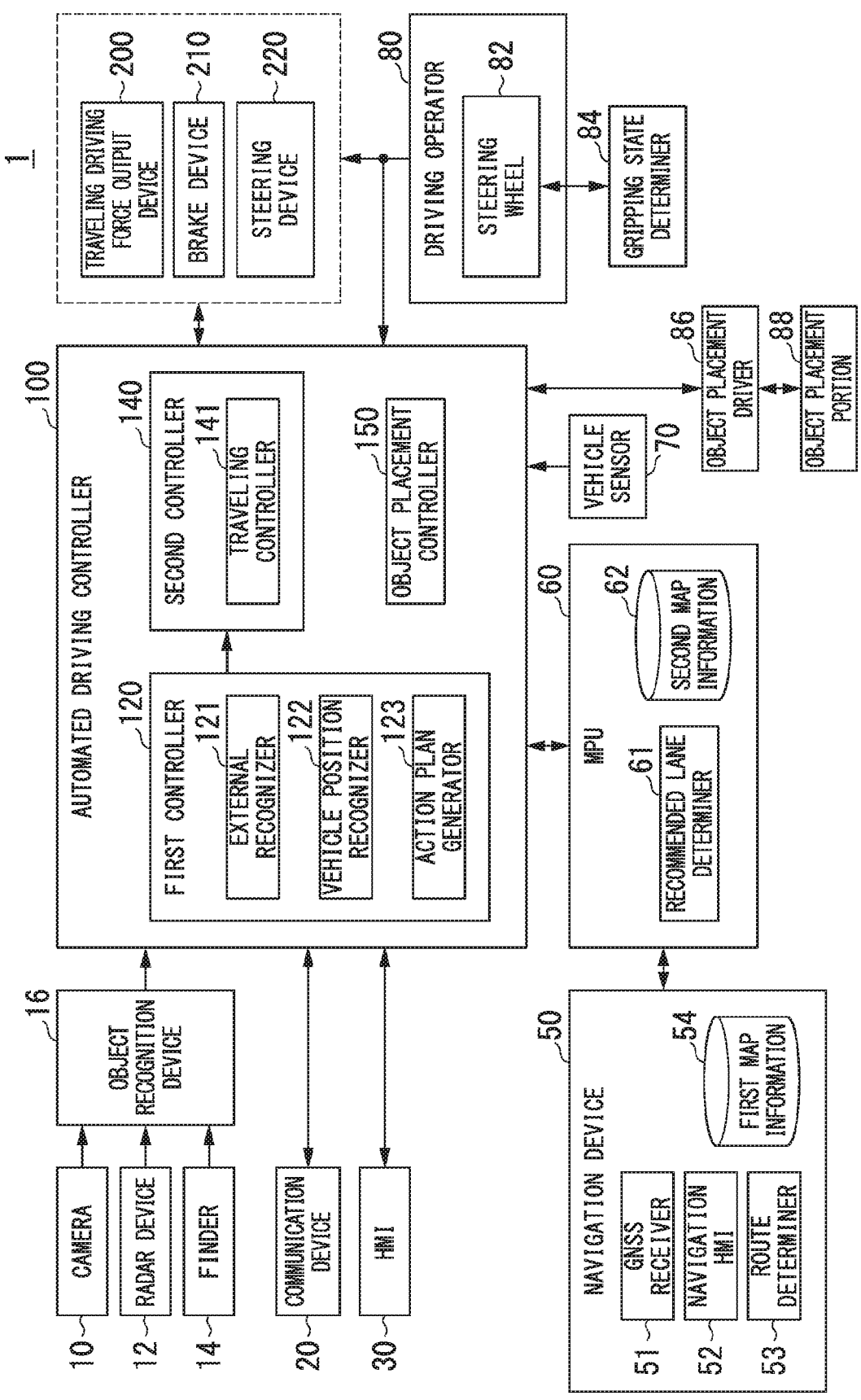
FIG. 1 is a configuration diagram of a vehicle system 1 including an automated driving controller 100.

FIG. 1 is a configuration diagram of a vehicle system 1 including an automated driving controller 100. A vehicle on which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination of these. The electric motor operates using power generated by a generator connected to the internal combustion engine or discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, a vehicle sensor 70, a driving operator 80, a gripping state determiner 84, an object placement driver 86, an object placement portion 88, an automated driving controller 100, a traveling driving force output device 200, a brake device 210, and a steering device 220. These devices and apparatuses are connected to one another by a multiplex communication line such as a controller area network (CAN) communication line, a serial communication line, a wireless communication network, or the like. A configuration shown in FIG. 1 is merely an example, and part of the configuration may be omitted, or another configuration may be added.

The camera 10 is, for example, a digital camera using a solid-state imaging device such as a charge coupled device (CCD) or a complementary metal oxide semiconductor (CMOS). One or a plurality of the cameras 10 may be attached to an arbitrary place of a vehicle (hereinafter, referred to as a host vehicle M) on which the vehicle system 1 is mounted. When imaging the front, the camera 10 is attached to a top of a front windshield, a rear of a windshield rear view mirror, or the like. The camera 10 images, for example, a periphery of the host vehicle M periodically and repeatedly. The camera 10 may be a stereo camera.

The radar device 12 emits radio waves such as millimeter waves to the periphery of the host vehicle M, and detects at least a location (a distance and a direction) of an object by detecting radio waves (reflected waves) reflected by the object. One or a plurality of the radar devices 12 are attached to an arbitrary place of the host vehicle M. The radar device 12 may detect the location and speed of an object by a frequency modulated continuous wave (FM-CW) method.

The finder 14 is a light detection and ranging or laser imaging detection and ranging (LIDAR) which measures scattered light with respect to irradiated light, and detects a distance to an object. One or a plurality of the finders 14 are attached to an arbitrary place of the host vehicle M.

The object recognition device 16 performs sensor fusion processing on a result of the detection performed by some or all of the camera 10, the radar device 12, and the finder 14, and recognizes the location, type, speed, and the like of an object. The object recognition device 16 outputs a result of the recognition to the automated driving controller 100.

The communication device 20 communicates with other vehicles existing in the periphery of the host vehicle M using, for example, a cellular network, a Wi-Fi network, a Bluetooth (registered trademark), a dedicated short range communication (DSRC), or the like, or communicates with various server devices via a wireless base station.

The HMI 30 presents various types of information to an occupant of the host vehicle M, and receives an input operation by the occupant. The HMI 30 includes various display devices, speakers, buzzers, touch panels, switches, keys, and the like.

The navigation device 50 includes, for example, a global navigation satellite system (GNSS) receiver 51, a navigation HMI 52, and a route determiner 53, and holds first map information 54 in a storage device such as a hard disk drive (HDD) or a flash memory. The GNSS receiver identifies a location of the host vehicle M on the basis of a signal received from a GNSS satellite. The location of the host vehicle M may be identified or supplemented by an inertial navigation system (INS) using an output of the vehicle sensor 70. The navigation HMI 52 includes a display device, a speaker, a touch panel, a key, and the like. The navigation HMI 52 may be partially or entirely shared with the HMI 30 described above. The route determiner 53 decides, for example, a route from the location of the host vehicle M identified by the GNSS receiver 51 (or an input arbitrary location) to a destination input by the occupant using the navigation HMI 52 by referring to the first map information 54. The first map information 54 is, for example, information in which a road shape is represented by a link indicating a road and a node connected by the link. The first map information 54 may include road curvature, point of interest (POI) information, and the like. A route decided by the route determiner 53 is output to the MPU 60. In addition, the navigation device 50 may perform route guidance using the navigation HMI 52 on the basis of a route decided by the route determiner 53. Note that the navigation device 50 may be implemented, for example, by a function of terminal devices such as smartphones or tablet terminals owned by a user. In addition, the navigation device 50 may transmit a current location and a destination to the navigation server via the communication device 20, and may acquire a route returned from the navigation server.

The MPU 60 functions as, for example, a recommended lane determiner 61, and holds second map information 62 in a storage device such as an HDD or a flash memory. The recommended lane determiner 61 divides a route provided by the navigation device 50 into a plurality of blocks (for example, division per 100 [m] in a vehicle traveling direction), and decides a target lane for each block by referring to the second map information 62. The recommended lane determiner 61 performs a decision on which numbered lane from the left to travel. The recommended lane determiner 61 decides a recommended lane such that the host vehicle M can travel a reasonable route to proceed to a branch destination when there is a branch place, a junction place, or the like in the route.

The second map information 62 is map information with higher accuracy than the first map information 54. The second map information 62 includes, for example, information on a center of the lane or information on a boundary of the lane. In addition, the second map information 62 may include road information, traffic control information, address information (address/zip code), facility information, telephone number information, and the like. The road information includes information indicating a road type such as a high speed road, a paid road, a national road, and a prefecture road, the number of lanes of a road, a width of each lane, a slope of a road, a location of a road (three-dimensional coordinates including longitude, latitude, and height), curvature of a curve of a lane, locations of a junction and a branch point of a lane, a sign provided on a road, and the like. The second map information 62 may be updated at any time by accessing another device using the communication device 20.

The vehicle sensor 70 includes a vehicle speed sensor which detects a speed of the host vehicle M, an acceleration sensor which detects acceleration, a yaw rate sensor which detects an angular speed around a vertical axis, and a direction sensor which detects a direction of the host vehicle M.

The driving operator 80 includes, for example, an accelerator pedal, a brake pedal, a shift lever, a steering wheel 82, and other operators. A sensor which detects an amount of operation or a presence or absence of an operation is attached to the driving operator 80, and a result of the detection is output to the automated driving controller 100, or one or both of the traveling driving force output device 200, the brake device 210, and the steering device 220.

The gripping state determiner 84 detects whether a steering wheel is gripped by the occupant of the vehicle. The gripping state determiner 84 detects whether the steering wheel is gripped by the occupant of the vehicle on the basis of a change in voltage acquired from a plurality of electrodes provided on the steering wheel 82 or a change in resistance value, and outputs a result of the detection to the automated driving controller 100. The gripping state determiner 84 detects that the occupant of the vehicle grips the steering wheel with one hand, for example, when there is one area at which the change in voltage is equal to or greater than a predetermined degree, and detects that the occupant of the vehicle grips the steering wheel with both hands when there are two areas at which the change in voltage is equal to or greater than the predetermined degree. In addition, the gripping state determiner 84 may also detect whether the steering wheel is gripped by the occupant of the vehicle on the basis of a result of detection of a plurality of capacitance sensors provided in the steering wheel 82.

The object placement driver 86 sets the object placement portion 88 to be in an easy-to-use state for the occupant of the vehicle in accordance with an instruction of the automated driving controller 100. An easy-to-use state is an easy-to-use state as compared to a state of the object placement portion 88 immediately before. For example, setting to an easy-to-use state includes changing from a state in which the object placement portion 88 is stored to a state in which the object placement portion 88 emerges to be used by the occupant of the vehicle, moving the object placement portion 88 closer to the occupant of the vehicle as compared to a state immediately before, changing a state in which a placement surface of the object placement portion 88 is directed to face in a direction different from a horizontal direction to a state in which to face in the horizontal direction (or making a direction of the placement surface of the object placement portion 88 closer to the horizontal direction as compared to a state immediately before), and the like. Hereinafter, the easy-to-use state as compared to the state of the object placement portion 88 immediately before is referred to as a "second mode", and the state immediately before the second mode is referred to as a "first mode." Note that a first mode may be difficult to use for the occupant of the vehicle, but includes a state in which it is possible to easily place an object in the object placement portion 88, and a second mode includes a state in which it is possible to more easily place an object in the object placement portion 88 than in the first mode. The object placement driver 86 causes, for example, the object placement portion 88 to emerge (protrude) from a storage, or the emerged object placement portion 88 to be stored in the storage.

The automated driving controller 100 includes, for example, a first controller 120, a second controller 140, and an object placement controller 150. Each of the first controller 120, the second controller 140, and the object placement controller 150 is implemented by a processor such as a central processing unit (CPU) executing a program (software). In addition, some or all of the functional units may be implemented by hardware such as large scale integration (LSI), an application specific integrated circuit (ASIC), or a field-programmable gate array (FPGA), and may also be implemented by a cooperation of software and hardware.

The first controller 120 includes, for example, an external recognizer 121, a vehicle position recognizer 122, and an action plan generator 123. A "vehicle control system" includes the action plan generator 123, the second controller 140, and the object placement controller 150.

The external recognizer 121 recognizes a location of a surrounding vehicle, and the state such as speed and acceleration on the basis of information input from the camera 10, the radar device 12, and the finder 14 via the object recognition device 16. The location of surrounding vehicle may be represented by a representative point such as a center of gravity of the surrounding vehicle or a corner, and may be represented by an area represented by a contour of the surrounding vehicle. The "state" of surrounding vehicle may include acceleration or jerk of surrounding vehicle, or the "action state" (for example, whether the surrounding vehicle is changing a lane or intends to change a lane). Moreover, the external recognizer 121 may also recognize locations of guardrails, telephone poles, parking vehicles, pedestrians, or other objects in addition to surrounding vehicles.

The vehicle position recognizer 122 recognizes, for example, a lane (a traveling lane) in which the host vehicle M is traveling, and a relative location and posture of the host vehicle M with respect to the traveling lane. The vehicle position recognizer 122 recognizes the traveling lane by comparing, for example, a pattern of road division lines obtained from the second map information 62 (for example, an array of solid and broken lines), and a pattern of road division lines in the periphery of the host vehicle M recognized from an image captured by the camera 10. In this recognition, the location of the host vehicle M acquired from the navigation device 50 or a result of the processing by the INS may be added.

Figure 2:
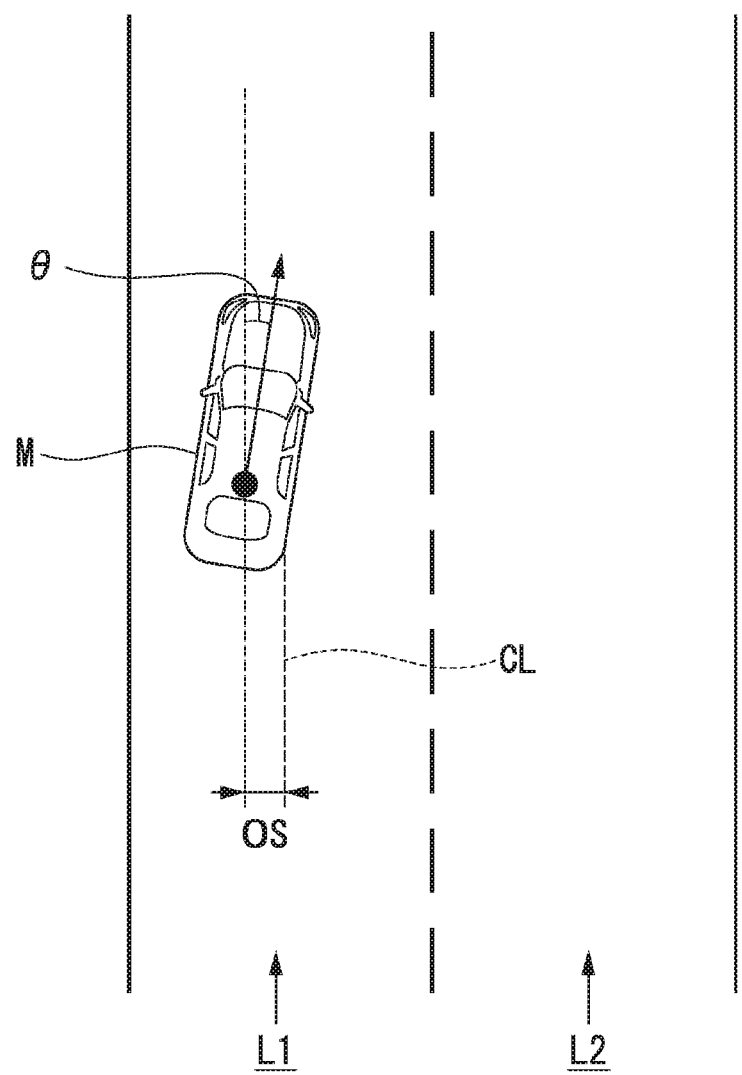
FIG. 2 is a view which shows how a relative location and a posture of a host vehicle M with respect to a traveling lane L1 are recognized by the vehicle position recognizer 122.

Then, the vehicle position recognizer 122 recognizes, for example, the location or the posture of the host vehicle M with respect to the traveling lane. FIG. 2 is a diagram which shows how the relative location and posture of the host vehicle M with respect to a traveling lane L1 are recognized by the vehicle position recognizer 122. The vehicle position recognizer 122 recognizes, for example, a deviation OS from a traveling lane center CL of a reference point (for example, a center of gravity) of the host vehicle M and an angle θ between a line connecting the traveling lane center CL and the traveling direction of the host vehicle M as the relative location and posture of the host vehicle M with respect to the traveling lane L1. Note that the vehicle position recognizer 122 may also recognize a location of the reference point of the host vehicle M with respect to either side end portion of the host lane L1, or the like as the relative location of the host vehicle M with respect to the traveling lane. The relative location of the host vehicle M recognized by the vehicle position recognizer 122 is provided to the recommended lane determiner 61 and the action plan generator 123.

The action plan generator 123 decides an event to be sequentially executed in automated driving to travel a recommended lane decided by the recommended lane determiner 61 and to cope with a periphery situation of the host vehicle M. The event includes, for example, a constant speed travel event that travels the same traveling lane at a constant speed, a following traveling event that follows a preceding vehicle, a lane change event, a merging event, a branching event, an emergency stop event, a handover event for ending automated driving and switching it to manual driving, and the like. In addition, while these events are executed, actions for avoidance may be planned on the basis of a periphery situation of the host vehicle M (presence of surrounding vehicles or pedestrians, lane construction due to road construction, or the like).

The action plan generator 123 generates a target trajectory for the host vehicle M to travel in the future. The target trajectory includes, for example, a speed component. For example, the target trajectory sets a plurality of future reference times for each predetermined sampling time (for example, about several seconds [sec]) and is generated as a set of target points (trajectory points) to be reached at these reference times. For this reason, when an interval between trajectory points is wide, this indicates to travel a section between the trajectory points at a high speed.

Figure 3:
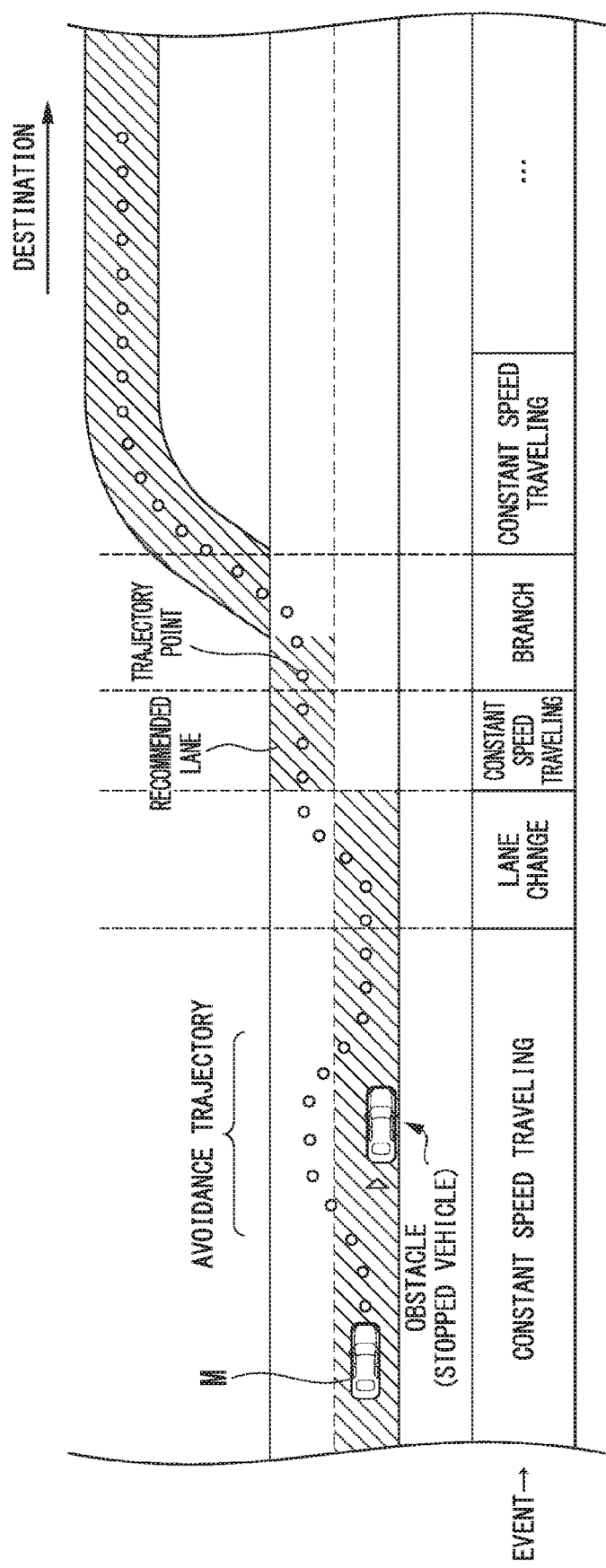
FIG. 3 is a diagram which shows how a target trajectory is generated on the basis of a recommended lane.

FIG. 3 is a diagram which shows how a target trajectory is generated on the basis of a recommended lane. As shown in FIG. 3, the recommended lane is convenient to travel along a route to a destination. The action plan generator 123 starts a lane change event, a branch event, a merging event, and the like if it approaches a predetermined distance before a switching point of the recommended lane (it may be decided according to a type of an event). When it is necessary to avoid an obstacle during execution of each event, an avoidance trajectory is generated as illustrated.

The action plan generator 123 generates, for example, a plurality of candidates for a target trajectory and selects an optimal target trajectory at a corresponding time in terms of safety and efficiency.

The action plan generator 123 switches between an automated driving mode and a manual driving mode when a handover event for ending automated driving and switching it to manual driving is executed. In addition, the action plan generator 123 switches between the automated driving mode and the manual driving mode on the basis of a signal input from an automated driving changeover switch (not shown). In addition, the action plan generator 123 switches the automated driving mode to the manual driving mode on the basis of an operation instructing the driving operator 80 to perform acceleration, deceleration, or steering. For example, the action plan generator 123 switches (overrides) the automated driving mode to the manual driving mode when a state in which an amount of operation indicated by a signal input by an operation with respect to the driving operator 80 exceeds a threshold has continued for a reference time or more. In the manual driving mode, a signal from the driving operator may be output to the traveling driving force output device 200, the brake device 210, or the steering device 220 via the automated driving controller 100, and may also be output to the traveling driving force output device 200, the brake device 210, or the steering device 220 without passing through the automated driving controller 100 from the driving operator.

In addition, the action plan generator 123 decides the automated driving mode on the basis of a decided event, a target trajectory, or the like. The automated driving mode includes a first automated driving mode with a high degree of automated driving and a second automated driving mode with a degree of automated driving lower than that of the first automated driving mode. The first automated driving mode is, for example, an automated driving mode in which an occupant of a vehicle does not have to monitor the periphery and gripping of a steering wheel of the vehicle is unnecessary, and the second automated driving mode is, for example, an automated driving mode in which the occupant of the vehicle needs to monitor the periphery and the gripping of the steering wheel of the vehicle is necessary. The first automated driving mode is an example of the "first driving mode." The second automated driving mode is an example of the "second driving mode."

In addition, since the manual driving mode is a driving mode in which the occupant of the vehicle grips the steering wheel and needs to monitor the periphery, it is another example of the "second driving mode." In the following description, the "second driving mode" indicates only the second automated driving mode, may indicate only the manual driving mode, or may also indicate both the second automated driving mode and the manual driving mode. For example, the automated driving mode is notified by the HMI 30.

The second controller 140 includes a traveling controller 141. The traveling controller 141 controls the traveling driving force output device 200, the brake device 210, and the steering device 220 such that the host vehicle M passes through a target trajectory generated by the action plan generator 123 at a scheduled time.

The function of the object placement controller 150 will be described below.

The traveling driving force output device 200 outputs a traveling driving force (torque) for traveling of a vehicle to a drive wheel. The traveling driving force output device 200 includes, for example, a combination of an internal combustion engine, an electric motor, and a transmission, and an ECU that controls them. The ECU controls the configuration described above in accordance with information input from the traveling controller 141 or information input from the driving operator 80.

The brake device 210 includes, for example, a brake caliper, a cylinder that transmits hydraulic pressure to the brake caliper, an electric motor that generates hydraulic pressure in the cylinder, and a brake ECU. The brake ECU controls an electric motor in accordance with the information input from the traveling controller 141 or the information input from the driving operator 80 such that a brake torque corresponding to a braking operation is output to each wheel. The brake device 210 may include a mechanism for transmitting a hydraulic pressure generated by an operation of a brake pedal included in the driving operator 80 to the cylinder via a master cylinder as a backup. Note that the brake device 210 is not limited to the configuration described above and may be an electronically controlled hydraulic pressure brake device that transmits the hydraulic pressure of the master cylinder to the cylinder by controlling an actuator in accordance with the information input from the traveling controller 141.

The steering device 220 includes, for example, a steering ECU and an electric motor. The electric motor applies, for example, a force to a rack and pinion mechanism to change a direction of the steering wheel. The steering wheel ECU drives the electric motor in accordance with the information input from the traveling controller 141 or the information input from the driving operator 80 to change the direction of the steering wheel.

[Control of Object Placement Portion]

Hereinafter, processing of setting the object placement portion 88 (for example, a table board) in an easy-to-use state for the occupant of the vehicle, which is executed by the object placement controller 150, will be described. The object placement controller 150 changes a state of the object placement portion 88 from a first mode to a second mode in accordance with a control state of automated driving executed by the action plan generator 123. In addition, the object placement controller 150 changes the state of the object placement portion 88 from the first mode to the second mode in accordance with a degree of automated driving executed by the action plan generator 123.

Figure 4:
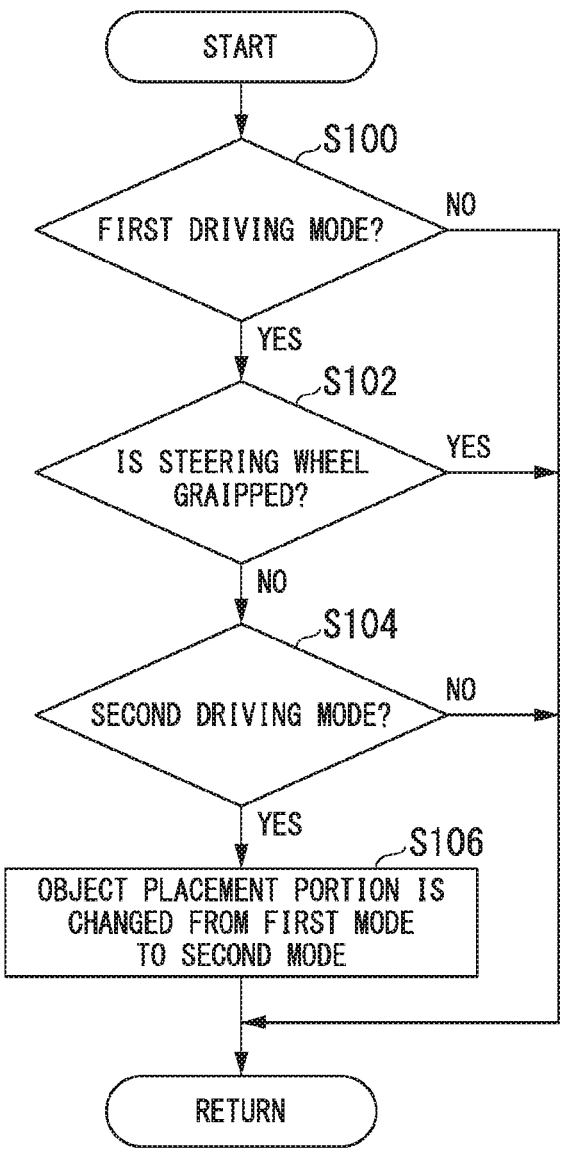
FIG. 4 is a flowchart which shows a flow of processing executed by the object placement controller 150.

FIG. 4 is a flowchart which shows a flow of processing executed by the object placement controller 150. First, the object placement controller 150 determines whether the first driving mode is being executed (step S100). If the first driving mode is not being executed, one routine processing of the present flowchart ends.

If the first driving mode is being executed, the object placement controller 150 determines whether the occupant of the vehicle grips the steering wheel 82 with both hands on the basis of a result of detection by the gripping state determiner 84 (step S102). Note that the object placement controller 150 may determine whether the occupant of the vehicle grips the steering wheel 82 with one hand. In addition, the processing of step S102 may also be omitted.

If the occupant of the vehicle grips the steering wheel 82 with both hands, one routine processing of the present flowchart ends. If the occupant of the vehicle does not grip the steering wheel 82 with both hands, the object placement controller 150 determines whether there is a schedule for shifting to the second driving mode within a predetermined time (step S104).

If there is no schedule for shifting to the second driving mode within a predetermined time, one routine processing of the present flowchart ends. If there is a schedule for shifting to the second driving mode within a predetermined time, the object placement controller 150 controls the object placement driver 86 to change the state of the object placement portion 88 from the first mode to the second mode (step S106). As a result, one routine processing of the present flowchart ends.

According to the processing described above, when the occupant of the vehicle holds, for example, an object, and therefore cannot hold the steering wheel 82 after a shift to the second driving mode, the object placement portion 88 for placing an object is in the easy-to-use state for the occupant of the host vehicle M. Accordingly, the occupant of the vehicle can easily place the object in the object placement portion 88, and the occupant of the vehicle is suppressed from panicking when the driving mode is switched. As a result, convenience for use by a user can be improved when automated driving is executed.

Moreover, the object placement controller 150 may change the state of the object placement portion 88 from a state in which it cannot be used by the occupant of the host vehicle M to a state in which it can be used in accordance with a control state of automated driving executed by the automated driving controller 100. In this case, the state in which the object placement portion can be used by the occupant of the host vehicle is an example of a "second mode," and the state in which it cannot be used by the occupant of the host vehicle is an example of a "first mode."

Figure 5:
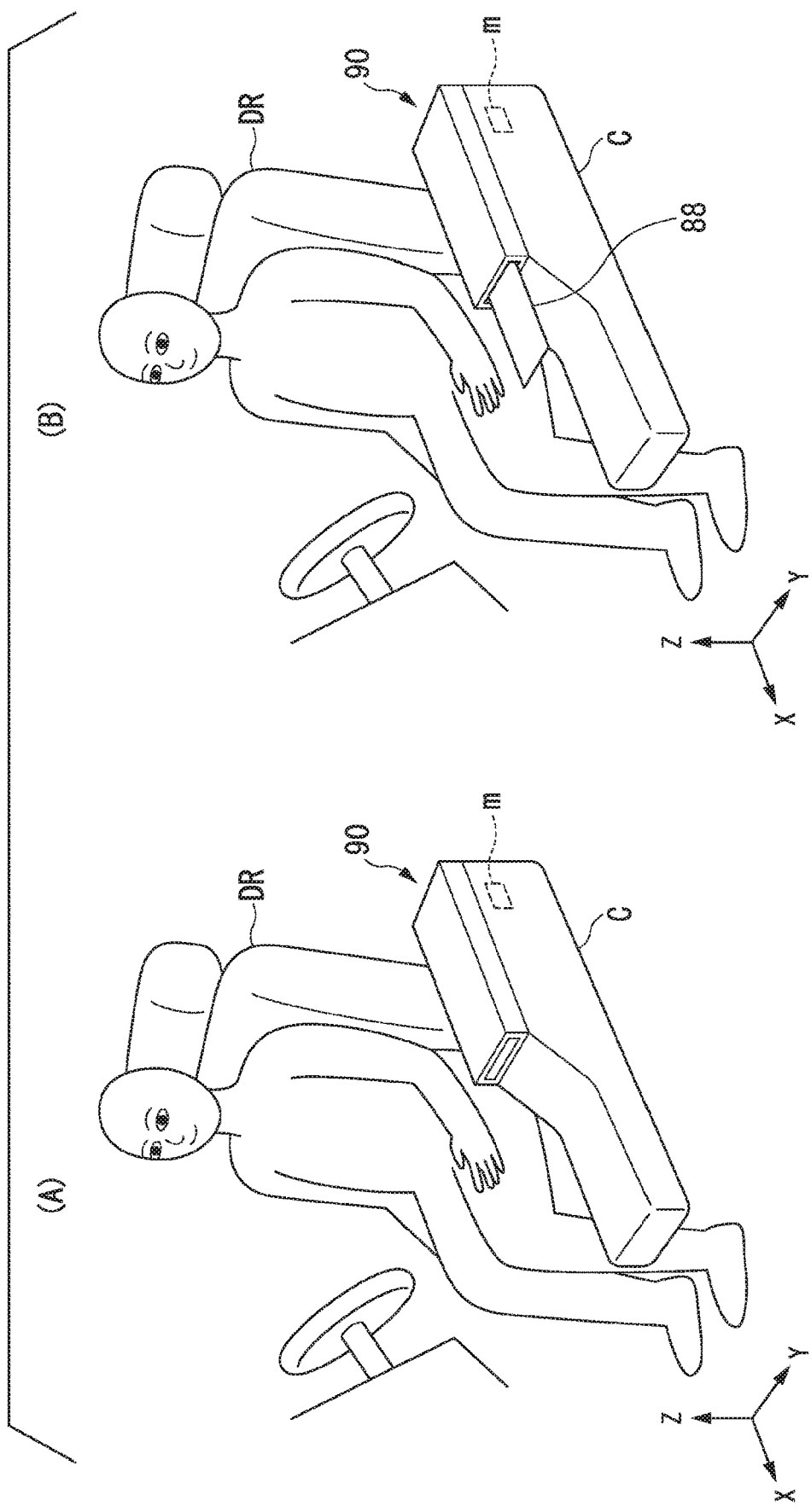
FIG. 5 is a diagram which shows an example of an object placement portion 88 (table board).

FIG. 5 is a diagram which shows an example of the object placement portion 88 (table board). For example, a center console C is disposed in a front-rear direction between a driver's seat DR and a passenger's seat (not shown). A storage 90 for storing the object placement portion 88 is provided above the center console C. For example, the storage 90 functions as an armrest that can be used by the occupant of the vehicle seated in the driver's seat. In addition, the object placement portion 88 stored in the storage 90 is stored to slide in the front-rear direction. A motor m for transmitting power to a drive mechanism (not shown) including an actuator connected to the object placement portion 88 is provided inside the center console C.

The object placement driver 86 drives the motor m to cause the object placement portion 88 to emerge from the storage 90 via the drive mechanism. As a result, as shown in FIG. 5(A), the object placement portion 88 emerges (second mode) from the state in which it is stored in the storage 90 (first mode) such that the occupant of the vehicle can use it as shown in FIG. 5(B). The object placement driver 86 drives the motor m in an opposite direction to a direction in which the object placement portion 88 protrudes from the storage 90 to store the object placement portion 88 in the storage 90 using power output by the motor m via the drive mechanism. As a result, the object placement portion 88 is in a state in which the occupant of the vehicle cannot use it.

According to the first embodiment described above, the object placement controller 150 sets the object placement portion 88 to be in the easy-to-use state for the occupant of the vehicle in accordance with a control state of automated driving executed by the automated driving controller 100, and thereby it is possible to provide the object placement portion 88 which is highly convenient for use by a user when executing automated driving.

Second Embodiment

Hereinafter, a second embodiment will be described. In the first embodiment, when the steering wheel 82 is not held and there is a schedule for shifting to the second driving mode within a predetermined time, the object placement portion 88 is in the easy-to-use state for the occupant of the host vehicle M. On the other hand, in the second embodiment, the object placement portion 88 is controlled to be in the easy-to-use state by the occupant of the vehicle when the HMI 30 outputs information requesting a switch to manual driving. Here, differences from the first embodiment will be mainly described, and descriptions of functions and the like shared with the first embodiment will be omitted.

The first controller 120 of the second embodiment causes a speaker or a display of the HMI 30 to output the information requesting a switch to manual driving when execution of automated driving ends. In addition, the object placement controller 150 of the second embodiment controls the object placement portion 88 to be in the easy-to-use state for the occupant of the host vehicle M when the HMI 30 outputs the information requesting a switch to manual driving.

Figure 6:
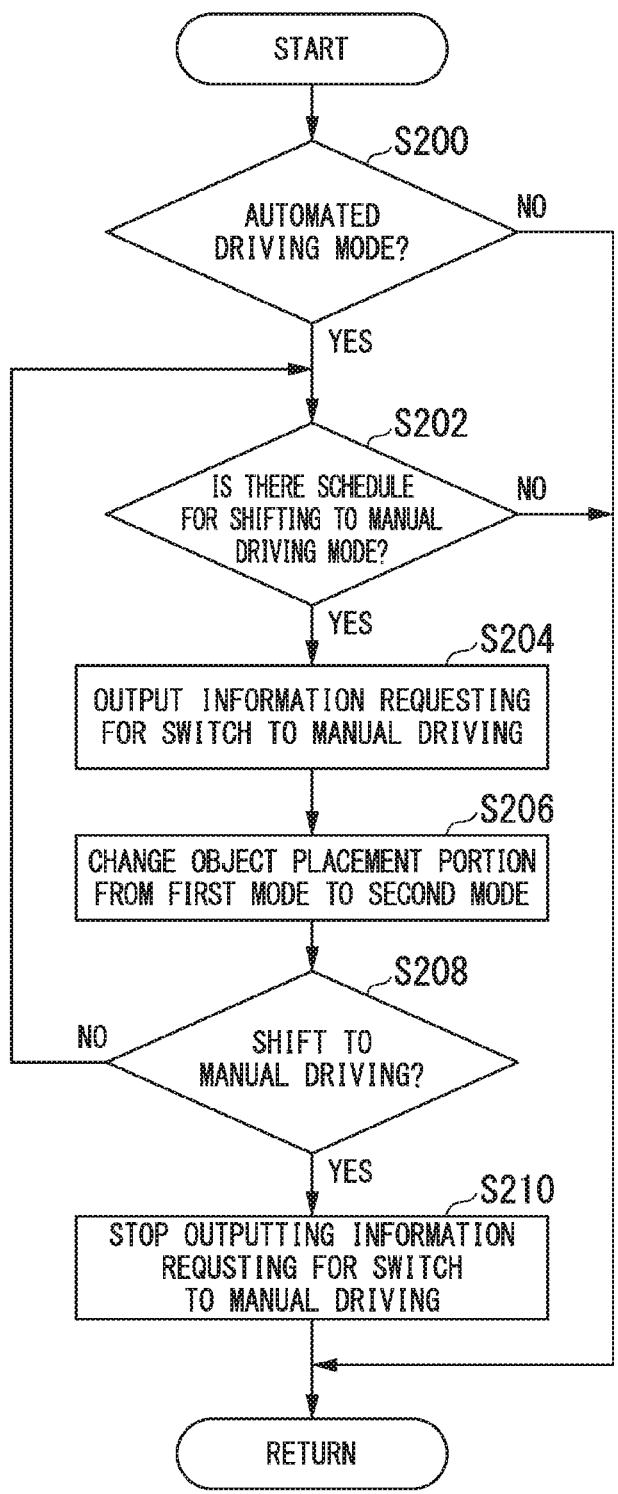
FIG. 6 is a flowchart which shows a flow of processing executed by an object placement controller 150 of a second embodiment.

FIG. 6 is a flowchart which shows a flow of processing executed by the object placement controller 150. First, the object placement controller 150 determines whether the automated driving mode is being executed (step S200). When the automated driving mode is not being executed, one routine processing of the present flowchart ends.

When the automated driving mode is being executed, the object placement controller 150 determines whether there is a schedule for shifting to the manual driving mode within a predetermined time (step S202). When there is no schedule for shifting to the manual driving mode, one routine processing of the present flowchart ends. When there is a schedule for shifting to the manual driving mode within a predetermined time, the first controller 120 causes the HMI 30 to output the information requesting the occupant of the host vehicle M to switch to manual driving (step S204). Next, the object placement controller 150 changes the state of the object placement portion 88 from the first mode to the second mode (step S206).

Next, the first controller 120 determines whether it is possible to shift to the manual driving mode on the basis of a result of detection by the gripping state determiner 84 (step S208). The first controller 150 determines that it is possible to shift to the manual driving mode, for example, when the steering wheel 82 is gripped by the occupant of the host vehicle M, and determines that it is not possible to shift to the manual driving mode when the steering wheel 82 is not gripped by the occupant of the host vehicle M.

When it is not possible to shift to the manual driving mode, the procedure returns to the processing of step S202. When it is possible to shift to the manual driving mode, the first controller 120 causes an output of the information requesting a switch to manual driving to stop (step S210). As a result, one routine processing of the present flowchart ends.

According to the processing described above, the object placement controller 150 sets the object placement portion 88 to be in the easy-to-use state for the occupant of the host vehicle M when the information requesting a switch to manual driving is output by the HMI 30, and thereby it is possible to provide an object placement portion which is highly convenient for use by a user.

Third Embodiment

Hereinafter, a third embodiment will be described. In the first embodiment, when the steering wheel 82 is not held and there is a schedule for shifting to the second driving mode within a predetermined time, the object placement portion 88 is in the easy-to-use state for the occupant of the vehicle. On the other hand, in the third embodiment, when the steering wheel 82 is not held, there is a schedule for shifting to the second driving mode within a predetermined time, and the occupant of the vehicle seated in the driver's seat holds an object, the object placement portion 88 is in the easy-to-use state for the occupant of the vehicle. Here, differences from the first embodiment will be mainly described, and descriptions of functions shared with the first embodiment and the like will be omitted.

Figure 7:
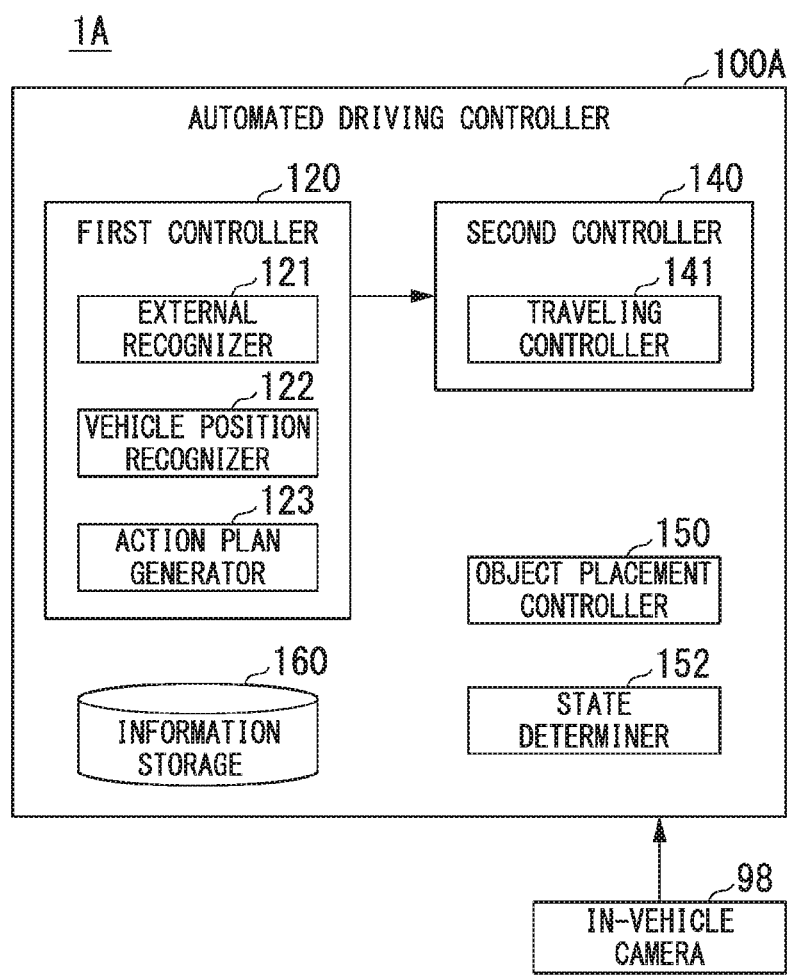
FIG. 7 is a diagram which shows a functional configuration of an automated driving controller 100A of a third embodiment.

FIG. 7 is a diagram which shows a functional configuration of the automated driving controller 100A of the third embodiment. A vehicle system 1A of the third embodiment includes an in-vehicle camera 98, a state determiner 152, and an information storage 160 in addition to functional constituents included in the vehicle system 1 of the first embodiment. The in-vehicle camera 98 and the state determiner 152 are examples of the "state determiner." In FIG. 7, the functional constituents described in the first embodiment other than the automated driving controller 100A and the in-vehicle camera 98 will be omitted. The in-vehicle camera 98 captures images of an upper body of the occupant seated in the driver's seat, the driver's seat, and an in-vehicle view centering on the center console C. The images captured by the in-vehicle camera 98 are output to the automated driving controller 100A.

[Image Recognition Processing]

The automated driving controller 100A of the third embodiment further includes the state determiner 152 and the information storage 160 in addition to the object placement controller 150. The state determiner 152 acquires the images captured by the in-vehicle camera 98, performs image recognition processing on the acquired images, and determines whether the occupant seated in the driver's seat holds an object or not.

The state determiner 152 obtains pixels or pixel groups having a large difference in luminance from pixels of the periphery in the image as feature points (edges), and recognizes contours of a person, a driver's seat, or an object (for example, a beverage container) from the feature points. In addition, the state determiner 152 may also recognize features such as eyes, a nose, and a mouth from distribution of the feature points.

Moreover, the contours recognized from the feature points obtained from an image are stored in the storage device included in the automated driving controller 100A. The image is an image obtained through a test or the like in which the occupant seated in the driver's seat is photographed while holding nothing. In addition, the contour of a driver's seat, the contour of an object, the contour of each of various states of a person, and the like acquired in advance by tests or the like are stored in the storage device.

The state determiner 152 compares the contour of an occupant seated in the driver's seat stored in the storage device in advance with a result of processing of recognizing an image (in-vehicle image) captured by the in-vehicle camera 98, recognizes that there is a person seated in the driver's seat when a contour estimated to be a seated person (or the features described above) is added to the contour of a driver's seat, and recognizes that there is no occupant seated in the driver's seat when it is not added.

The state determiner 152 compares the contour of an occupant seated in the driver's seat stored in the storage device in advance with a result of the processing of recognizing an in-vehicle image, and recognizes that there is a person holding an object when a contour estimated to be an object is added to the contour estimated to be a seated person. Moreover, when the contour and type of an object are stored in association in the storage device in advance, the state determiner 152 may compare the contour of an object stored in the storage device in advance with a result of the processing of recognizing an in-vehicle image, and identify the type of the object held by the person.

[Processing when Object Placement Portion is set in an Easy-to-Use State]

Figure 8:
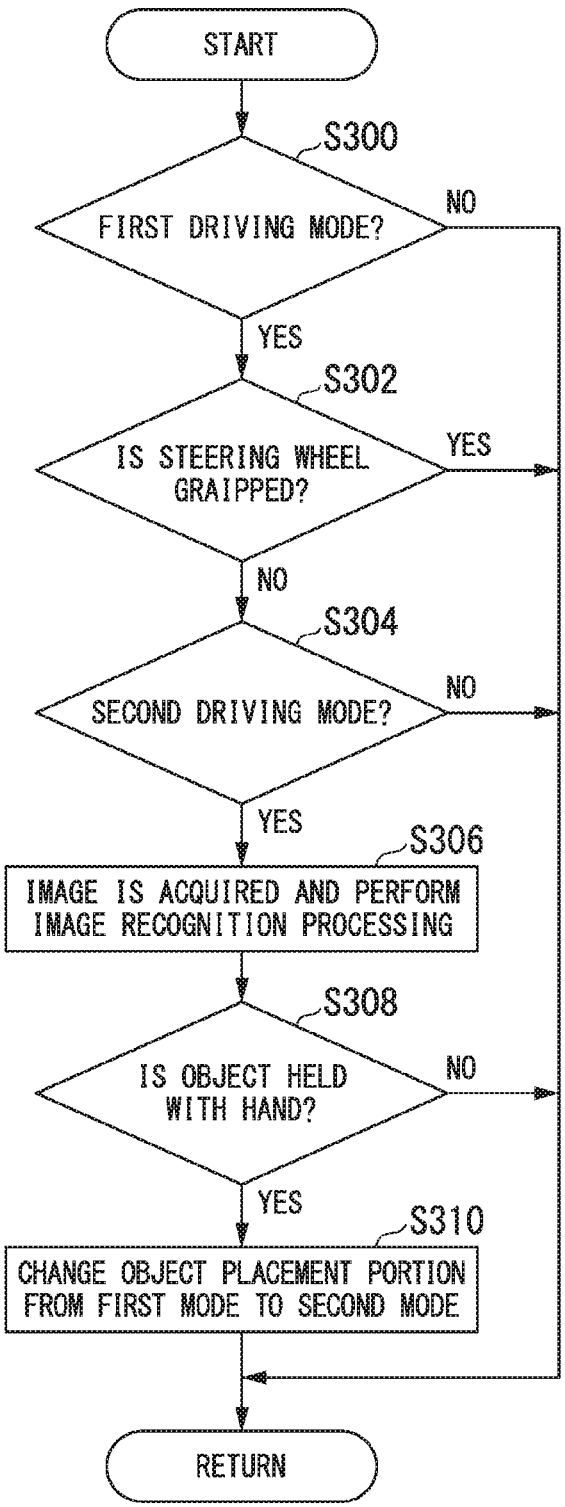
FIG. 8 is a flowchart which shows a flow of processing executed when an object placement portion 88 appears according to the third embodiment.

FIG. 8 is a flowchart which shows a flow of processing executed when the object placement portion 88 is set to an easy-to-use state according to the third embodiment. First, the object placement controller 150 determines whether the first driving mode is executed (step S300). When the first driving mode is not executed, one routine processing of the present flowchart ends.

When the first driving mode is executed, the object placement controller 150 determines whether the occupant of the vehicle grips the steering wheel 82 with both hands on the basis of a result of detection by the gripping state determiner 84 (step S302). Note that the object placement controller 150 may determine whether the occupant of the vehicle grips the steering wheel 82 with one hand.

When the occupant of the vehicle grips the steering wheel 82 with both hands, one routine processing of the present flowchart ends. When the occupant of the vehicle does not grip the steering wheel 82 with both hands, the object placement controller 150 determines whether there is a schedule for shifting to the second driving mode within a predetermined time (step S304).

When there is no schedule for shifting to the second driving mode within a predetermined time, one routine processing of the present flowchart ends. When there is a schedule for shifting to the second driving mode within a predetermined time, the state determiner 152 executes the processing of recognizing an in-vehicle image (step S306), and determines whether the occupant seated in the driver's seat holds an object in her or his hands (step S308).

When the occupant is not holding an object in her or his hands, one routine processing of the present flowchart ends. When the occupant is holding an object in her or his hands, the object placement controller 150 controls the object placement driver 86, and changes the object placement portion 88 from the first mode to the second mode (step S310). As a result, one routine processing of the present flowchart ends.

Note that the object placement controller 150 may set the object placement portion 88 in the second mode when the state determiner 152 determines that the occupant of the vehicle holds a beverage in her or his hands in the processing of step S308. This is because, if the driving mode is shifted to the automated driving mode in which the steering wheel 82 needs to be held while the occupant of the vehicle holds a beverage, there are particular cases in which the occupant panics to avoid spilling liquid in the vehicle.

According to the processing described above, in a case in which the occupant of the vehicle holds an object and the driving mode is shifted to the second driving mode, when the occupant cannot hold the steering wheel 82, the object placement portion 88 for placing the object is in the easy-to-use for the occupant of the vehicle. Accordingly, the occupant of the vehicle can easily place the object in the object placement portion 88, and it is possible to suppress the occupant of the vehicle from panicking at the time of switching a driving mode. As a result, convenience for users can be improved when automated driving is executed.

Figure 9:
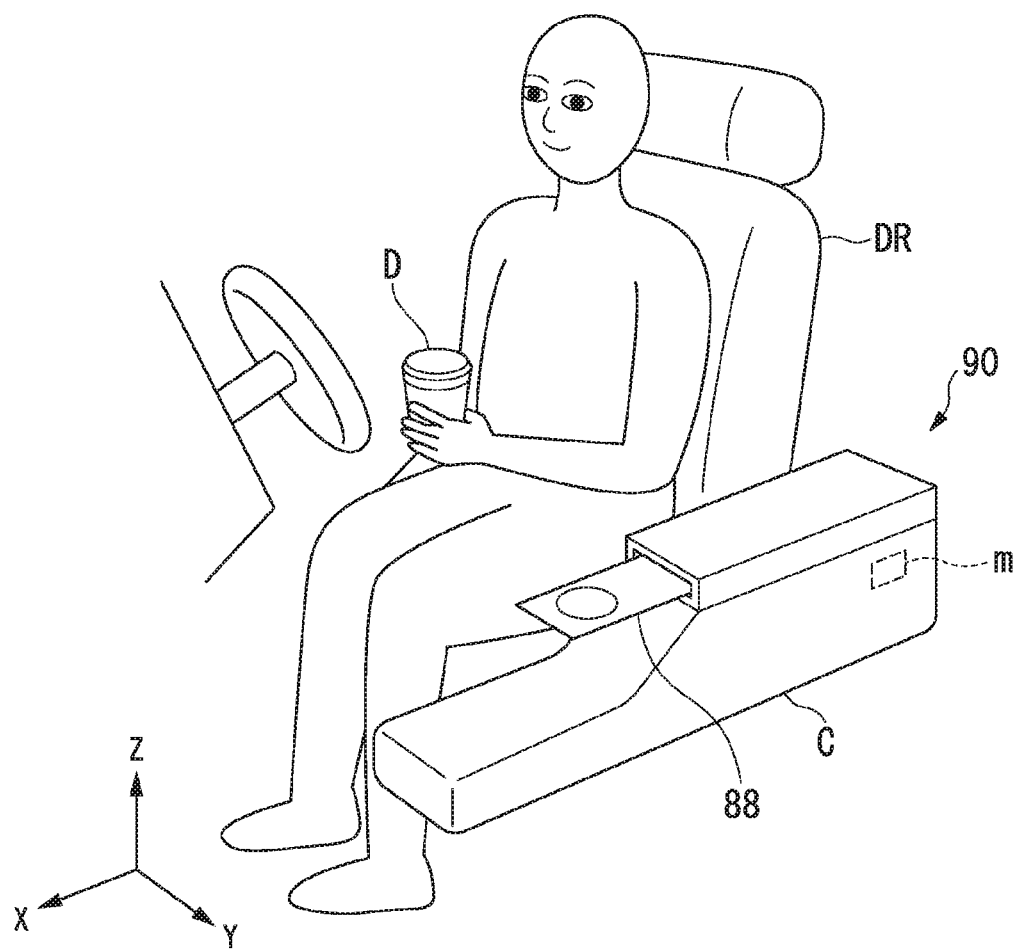
FIG. 9 is a diagram which shows an example of a state in which the object placement portion 88 appears.

FIG. 9 is a diagram which shows an example of the second mode. As shown, when the occupant of the vehicle does not hold the steering wheel 82 and holds an object (for example, a beverage D) in her or his hands when the driving mode is shifted to the second driving mode, the object placement portion 88 is in the second mode. As a result, the occupant of the vehicle can place the object that she or he holds in her or his hands in the object placement portion 88, and hold the steering wheel 82.

[Processing when Object Placement Portion is Stored]

Figure 10:
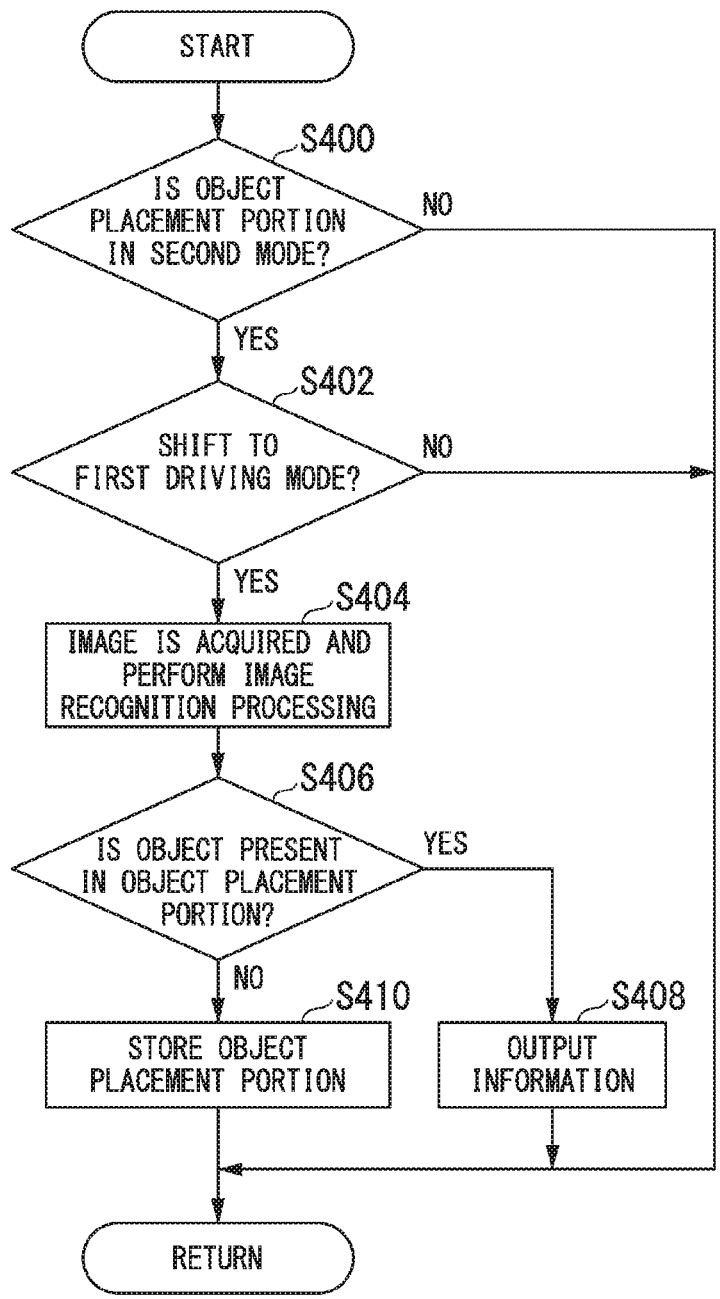
FIG. 10 is a flowchart which shows a flow of processing executed when the object placement portion 88 is stored according to the third embodiment.

FIG. 10 is a flowchart which shows a flow of processing executed when the object placement portion 88 is stored according to the third embodiment. The processing of the present flowchart is executed, for example, when the object placement portion 88 is controlled to be in the second mode and the second driving mode is executed.

First, the object placement controller 150 determines whether the object placement portion 88 s in the second mode (step S400). When the object placement portion 88 is not in the second mode, the one routine processing of the present flowchart ends.

When the object placement portion 88 is in the second mode, the object placement controller 150 determines whether there is a schedule for shifting to the first driving mode within a predetermined time (step S402). When there is no schedule for shifting to the first driving mode within a predetermined time, the one routine processing of the present flowchart ends.

In the case of the schedule of shifting to the first driving mode within a predetermined time, the state determiner 152 executes the processing of recognizing an in-vehicle image (step S404). The object placement controller 150 determines whether an object is placed in the object placement portion 88 on the basis of a result of the processing of recognizing an image (step S406). When an object is placed in the object placement portion 88, the object placement controller 150 causes the HMI 30 to output information indicating that the object is placed in the object placement portion 88 (step S408). When an object is not placed in the object placement portion 88, the object placement controller 150 stores the object placement portion 88 in the storage 90 (step S410). As a result, the one routine processing of the present flowchart ends.

According to the processing described above, when an object is placed in the object placement portion 88 at the time of shifting to the first driving mode, the occupant of the vehicle can notice existence of the object by an output of the information indicating that the object is placed in the object placement portion 88 and can hold and use the object after shifting to the first driving mode. In addition, since the object placement portion 88 is not used when the object is not placed in the object placement portion 88, the object placement portion 88 is automatically stored in the storage 90. As a result, convenience for users can be improved when automated driving is executed.

Figure 11:
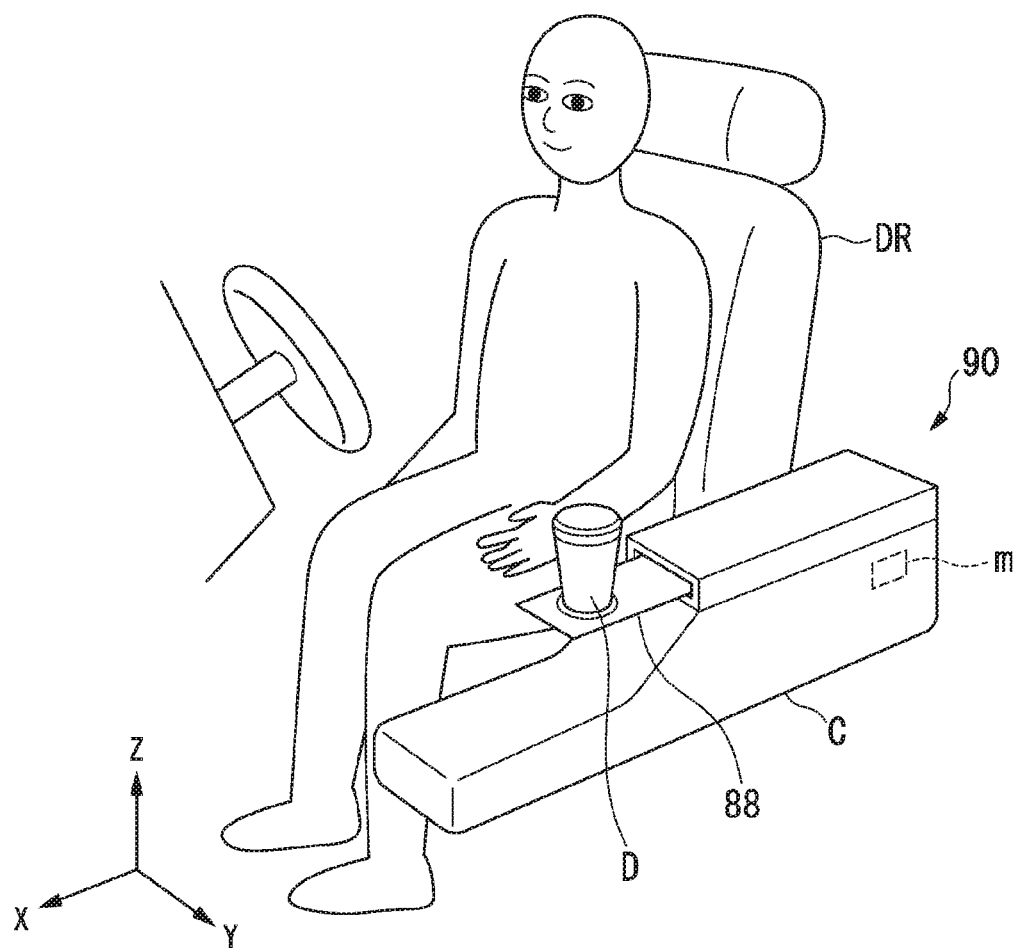
FIG. 11 is a diagram which shows an example of a scene in which information indicating that an object is placed in the object placement portion 88 is output.

FIG. 11 is a diagram which shows an example of a scene in which information indicating that an object is placed in the object placement portion 88 is output. As shown in FIG. 11, when the object placement portion 88 is in the easy-to-use state (second mode) for the occupant of the vehicle, there is a schedule of shifting to the first driving mode within a predetermined time and an object is placed in the object placement portion 88, the information indicating that an object is placed in the object placement portion 88 is output. On the other hand, if the object placement portion 88 is in the easy-to-use state for the occupant of the vehicle, there is a schedule for shifting to the first driving mode within a predetermined time and an object is not placed on the object placement portion 88, the object placement portion 88 is stored in the storage 90 (turns to be second mode).

According to the third embodiment described above, when the driving mode is shifted from the first driving mode to the second driving mode, the object placement controller 150 causes the object placement portion 88 to be in the easy-to-use state for the occupant of the vehicle. In addition, after the object placement controller 150 causes the object placement portion 88 to be in the easy-to-use state for the occupant of the vehicle, when the driving mode is shifted from the second driving mode to the first driving mode, the object placement portion 88 is returned to be in a state before being in the easy-to-use for the occupant of the vehicle. As a result, it is possible to provide the object placement portion 88 which is more highly convenient for use by a user when automated driving is executed.

Modified Example 1

A modified example 1 is different from the first embodiment in a structure in which the object placement portion 88 is in an easy-to-use state for the occupant of the vehicle. Here, differences from the first embodiment will be mainly described, and descriptions of a function and the like shared with the first embodiment will be omitted.

Figure 12:
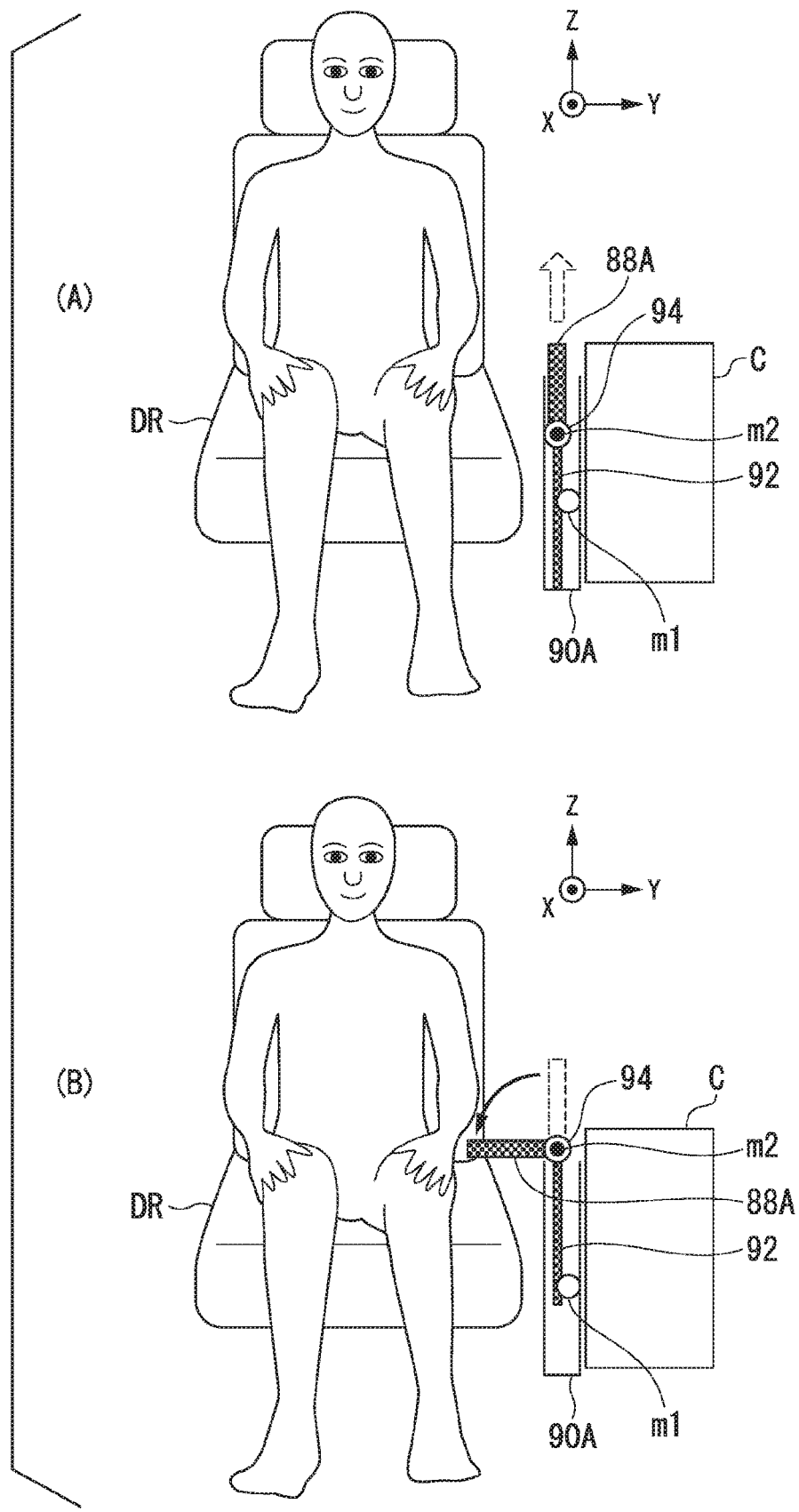
FIG. 12 is a diagram for describing an object placement portion 88A of a modified example 1.

FIG. 12 is a diagram for describing an object placement portion 88A of a modified example 1. The example shown is a view viewed from the front side to the rear side of the host vehicle M. In the example shown, constituents other than a driver's seat DR, a center console C, and a storage 90A are omitted. The object placement portion 88A of the modified example 1 is stored in the storage 90A provided between the center console C and the driver's seat DR. In addition, as shown in the upper part of FIG. 12, the object placement portion 88A is stored in the storage 90A (first mode) such that a surface of the object placement portion 88A on which an object is placed is parallel to a height direction (Z direction) (first mode). In addition, the object placement portion 88A is supported by, for example, a tooth-cut support body 92. The support body 92 is connected to the motor m1 via a gear mechanism. A rotator 94 and a motor m2 which transfers power to the rotator 94 and causes the rotator 94 to rotate are provided between the object placement portion 88 and the support body 92.

When the object placement portion 88A emerges as shown in the upper part of FIG. 12, the motor m1 connected to the support body 92 drives, a rotation force of the motor m1 is transmitted to the support body 92 via a gear mechanism, and the support body 92 is lifted upward, and thereby the object placement portion 88 protrudes from the storage 90A. Then, the motor m2 drives, the rotator 94 rotates, and thus the object placement portion 88A rotates by 90 degrees in a direction of the driver's seat DR. This cause the object placement portion 88 to emerge on knees of the occupant of the vehicle seated in the driver's seat DR (second mode). In addition, when the emerged object placement portion 88 is stored in the storage 90A, the object placement portion 88 is stored in the storage 90A in a reverse procedure to a procedure in which the object placement portion 88 emerges from the storage 90A.

Note that, when it is determined that the object placement portion 88A is caused to emerge and brought in contact with an object on the basis of a result of image recognition processing, the object placement controller 150 may perform a warning and the like before the object placement portion 88A is caused to emerge.

Moreover, the vehicle system 1 may include both the object placement portion 88 and the object placement portion 88A and cause one or both of the object placement portions 88 (88A) to emerge. For example, when it is determined that the occupant seated in the driver's seat holds an object with both hands on the basis of a result of image recognition processing, the object placement controller 150 may cause both object placement portions 88 (88A) to emerge.

According to the modified example 1 described above, the storage 90A is provided between the center console C and the driver's seat DR, and thereby it is possible to obtain the same effect as in the first embodiment, and to effectively use a space between the center console C and the driver's seat DR.

Modified Example 2

In a modified example 2, in the first embodiment, it is described that the object placement portion 88 is in an easy-to-use state for the occupant of the vehicle when the automated driving mode is shifted from the first driving mode to the second driving mode. In contrast, in the modified example 2, the object placement portion 88 is in the easy-to-use state for the occupant of the vehicle when the mode is shifted from the second driving mode to the first driving mode. Here, differences from the first embodiment will be mainly described, and descriptions of functions and the like shared with the first embodiment will be omitted.

Figure 13:
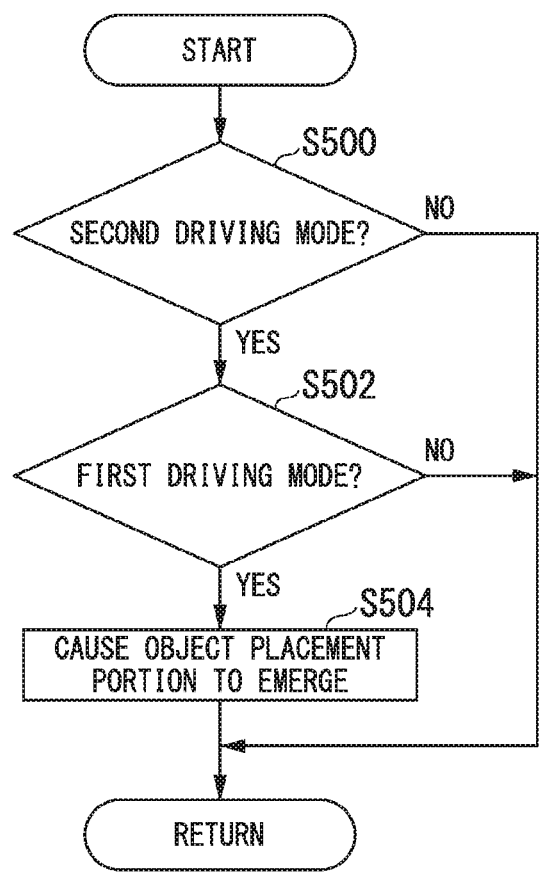
FIG. 13 is a flowchart which shows a flow of processing executed by an object placement controller 150 of a modified example 2.

FIG. 13 is a flowchart which shows a flow of processing executed by the object placement controller 150 of a modified example 2. First, the object placement controller 150 determines whether the second driving mode is being executed (step S500). When the second driving mode is not being executed, one routine processing of the present flowchart ends.

When the second driving mode is executed, the object placement controller 150 determines whether there is a schedule for shifting to the first driving mode within a predetermined time (step S502).

When there is no schedule of shifting to the first driving mode within a predetermined time, one routine processing of the present flowchart ends. When there is a schedule of shifting to the first driving mode within a predetermined time, the object placement controller 150 controls the object placement driver 86 to change the object placement portion 88 from the first mode to the second mode (step S504). As a result, the one routine processing of the flowchart ends.

According to the modified example 2 described above, since the object placement portion 88 is in the easy-to-use state for the occupant of the vehicle when the driving mode is shifted from the second driving mode to the first driving mode, it is possible to easily place an object used for activity in a vehicle in the object placement portion 88 when a degree of automated driving is high and an activity range within a vehicle of the occupant of the vehicle is wide. For example, when the degree of automated driving is high and the occupant of the vehicle eats, it is possible to easily place food and beverage in the object placement portion 88. In this manner, convenience for the occupant of the vehicle is improved.

Note that the object placement portion 88 is in the easy-to-use state for the occupant of the vehicle when the driving mode is shifted from the first driving mode to the second driving mode as described in the first embodiment, or the object placement portion 88 may also be in the easy-to-use state for the occupant of the vehicle when the driving mode is shifted from the second driving mode to the first driving mode as described in the modified example 2 by the occupant of the vehicle. For example, the occupant of the vehicle operates a touch panel or the like included in the HMI 30 and sets a timing of causing the object placement portion 88 in the easy-to-use state for the occupant of the vehicle. As a result, it is possible to set a timing of the object placement portion 88 in the easy-to-use state for the occupant of the vehicle such that convenience is increased for the occupant of the vehicle.

As described above, embodiments of the present invention have been described using the embodiments, but the present invention is not limited to such embodiments at all, and various modifications and substitutions can be made within a range not departing from the gist of the present invention.

REFERENCE SIGNS LIST

1 Vehicle system
100 Automated driving controller
120 First controller
121 External recognizer
122 Vehicle position recognizer
123 Action plan generator
140 Second controller
141 Traveling controller
150 Object placement controller
152 State determiner
154 Notification controller

What is claim is:

1. A vehicle control system comprising:
an object placement portion in which an object can be placed;
an automated driving controller configured to execute automated driving for automatically controlling at least one of acceleration, deceleration, and steering of a vehicle; and
an object placement controller configured to change the object placement portion from a first mode to a second mode in accordance with a control state of automated driving executed by the automated driving controller,
wherein the first mode is a state in which the object placement portion is stored in a storage,
the second mode is a state in which the object placement portion has fully emerged from the storage,
the automated driving controller executes the automated driving by varying a degree of automated driving,
the object placement controller sets the object placement portion in the second mode when the degree of automated driving executed by the automated driving controller decreases.

2. The vehicle control system according to claim 1, wherein the second mode is a state in which a location of the object placement portion is closer to the occupant of the vehicle than in the first mode.

3. The vehicle control system according to claim 1, wherein the object placement controller returns the object placement portion to the first mode when the object placement portion is in the second mode and the degree of automated driving increases.

4. The vehicle control system according to claim 3, wherein
the object placement controller is configured to detect a state of the object placement portion,
wherein, in a case in which the object placement portion is in the second mode and the degree of automated driving increases, the object placement controller maintains the object placement portion in the second mode when the object placement controller determines that there is an object in the object placement portion.

5. The vehicle control system according to claim 1, wherein
the object placement controller is configured to detect a state of the object placement portion,
wherein, in a case in which the object placement portion is in the second mode and the degree of automated driving increases, the object placement controller maintains the object placement portion in the second mode when the object placement controller determines that there is an object in the object placement portion.

6. The vehicle control system according to claim 1, wherein
the object placement controller is configured to detect a state of the object placement portion,
wherein, in a case in which the degree of automated driving increases, the object placement controller causes an information output device to output information indicating that there is an object when the object placement controller determines that there is an object in the object placement portion.

7. The vehicle control system according to claim 1, further comprising:
an output device configured to output information,
wherein the automated driving controller causes the output device to output information requesting a switch to manual driving when execution of the automated driving ends, and
the object placement controller sets the object placement portion to be in the second mode when the output device outputs information requesting a switch to the manual driving.

8. The vehicle control system according to claim 1, wherein
the object placement controller is configured to detect a state of the occupant of the vehicle,
wherein the object placement controller sets the object placement portion in the second mode when the the object placement portion determines that the occupant of the vehicle holds an object in her or his hands.

9. The vehicle control system according to claim 1,
wherein the object placement controller sets the object placement portion in the second mode by causing the object placement portion to emerge between a driver's seat and a passenger's seat.

10. The vehicle control system according to claim 1, wherein the automated driving controller is configured to;
determine a driving mode from among of a plurality of driving modes, wherein the plurality of driving mode includes manual driving mode, a first automated driving mode, and a second automated driving mode with a degree of automated driving lower than that of the first automated driving mode,
control the vehicle based on the driving mode that is determined,
the object placement controller configured to set the object placement portion in the second mode when the driving mode is switched to the second driving mode from the first driving mode.

11. The vehicle control system according to claim 10,
wherein the object placement controller is configured to set the object placement portion in the first mode when the vehicle is controlled in the first driving mode, and switch the object placement portion to the second mode from the first mode when the driving mode is switched to the second driving mode from the first driving mode.

12. The vehicle control system according to claim 1,
wherein the second mode is a state in which a direction of a placement surface of the object placement portion is closer to a horizontal direction than in the first mode.

13. A vehicle control method using a vehicle control device, the vehicle control method comprising:
executing automated driving for automatically controlling at least one of acceleration, deceleration, and steering of a vehicle,
executing the automated driving by varying a degree of automated driving,
setting an object placement portion in which an object can be placed from a first mode to a second mode in accordance with a control state of the executed automated driving, wherein the first mode is a state in which the object placement portion is stored in a storage, the second mode is a state in which the object placement portion has fully emerged from the storage,
setting the object placement portion in the second mode when the degree of automated driving decreases.

14. A non-transitory computer-readable storage medium that stores a computer program to be executed by a computer to perform at least:
execute automated driving for automatically controlling at least one of acceleration, deceleration, and steering of a vehicle,
execute the automated driving by varying a degree of automated driving; and
set an object placement portion in which an object can be placed from a first mode to a second mode mode in accordance with a control state of the executed automated driving, wherein the first mode is a state in which the object placement portion is stored in a storage, the second mode is a state in which the object placement portion has fully emerged from the storage,
set the object placement portion in the second mode when the degree of automated driving decreases.

* * * * *